United States Patent
Ramon et al.

(10) Patent No.: US 7,018,290 B2
(45) Date of Patent: Mar. 28, 2006

(54) GRAIN TANK COVER FOR AN AGRICULTURAL HARVESTER

(75) Inventors: Marc E. Ramon, Bruges (BE); Marc R. M. Jonckheere, Snellegem (BE); Frank R. G. Duquesne, Zwevegem (BE)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/872,219

(22) Filed: Jun. 18, 2004

(65) Prior Publication Data

US 2004/0259612 A1 Dec. 23, 2004

(30) Foreign Application Priority Data

Jun. 21, 2003 (GB) .................................. 0314554

(51) Int. Cl.
*A01F 12/60* (2006.01)
(52) U.S. Cl. ........................................ 460/119; 460/23
(58) Field of Classification Search ................... 296/15, 296/173, 175, 26.04, 26.09, 99.1; 460/23, 460/119
See application file for complete search history.

(56) References Cited

U.S. PATENT DOCUMENTS

| | | | | |
|---|---|---|---|---|
| 3,024,063 A | * | 3/1962 | Robinson | 296/100.15 |
| 3,246,313 A | * | 4/1966 | Weaklend | 340/617 |
| 4,544,196 A | * | 10/1985 | Schmeichel et al. | 296/26.07 |
| 4,756,571 A | * | 7/1988 | Lake | 296/100.1 |
| 4,960,300 A | * | 10/1990 | Burvee | 296/34 |
| 5,028,088 A | * | 7/1991 | Del Monico et al. | 296/26.04 |
| 5,088,785 A | * | 2/1992 | Lee | 296/26.05 |
| 5,125,221 A | | 6/1992 | Looney | |
| 5,427,572 A | * | 6/1995 | Deutsch et al. | 460/119 |
| 5,616,077 A | * | 4/1997 | Covington et al. | 460/119 |
| 6,126,220 A | * | 10/2000 | Brasher | 296/26.04 |
| 6,467,830 B1 | * | 10/2002 | Cortright | 296/37.6 |
| 6,508,705 B1 | * | 1/2003 | Van Overschelde | 460/23 |
| 6,692,352 B1 | * | 2/2004 | Gerber et al. | 460/119 |
| 6,701,701 B1 | * | 3/2004 | Wigdahl et al. | 56/28 |

FOREIGN PATENT DOCUMENTS

DE 4120731 A1 12/1992

* cited by examiner

*Primary Examiner*—Thomas B. Will
*Assistant Examiner*—Alicia Torres
(74) *Attorney, Agent, or Firm*—Rebecca Henkel

(57) ABSTRACT

A grain tank of an agricultural harvester having a top formed with an opening is provided. A cover overlies the opening, and a lifting mechanism is provided for raising the cover to an elevated position. Side panels extend between the cover and the top of the grain tank when the cover is in the elevated position to provide an enclosed extension volume that increases the storage capacity of the grain tank. At least two of the side panels are rigidly and permanently connected to the cover.

16 Claims, 3 Drawing Sheets

GRAIN TANK COVER FOR AN AGRICULTURAL HARVESTER

FIELD OF THE INVENTION

The present invention relates to a grain tank for an agricultural harvester.

BACKGROUND OF THE INVENTION

When a harvester is being driven along a public road, its height needs to be restricted to permit it to pass under bridges and footpaths. While operating in a field on the other hand, it is desirable for the volume of its grain tank to be increased and if this involves increasing the height of the harvester then it would not present a safety hazard. For these reasons it has already been proposed to provide the grain tank of a harvester with an extension assembly that can be collapsed when the vehicle is driven along a public road and extended during field operations.

EP-A-1 201 112 discloses a grain tank having an extension assembly which comprises two pairs of mutually opposed panels that are movable relative to the tank between a lowered position in which they serve as a cover for an opening in the top of the tank and a raised position in which they define the side walls of an extension volume that communicates through the opening with the interior of the tank.

OBJECT OF THE INVENTION

A disadvantage of this type of collapsible extension assembly is that its complexity makes it costly and for this reason it is better suited to larger and more expensive harvesters. The present invention seeks therefore to provide a simpler and less expensive alternative that is economically viable for smaller harvesters.

SUMMARY OF THE INVENTION

According to a first aspect of the present invention, there is provided a grain tank of an agricultural harvester having a top formed with an opening, a cover overlying the opening, a lifting mechanism for raising the cover to an elevated position and side panels that extend between the cover and the top of the grain tank when the cover is in the elevated position to provide an enclosed extension volume that increases the storage capacity of the grain tank, wherein at least two of the side panels are rigidly and permanently connected to the cover.

Most simply, the cover could be provided with four rigid side panels to form in essence an inverted box that can be telescopically collapsed into the top of the grain tank to allow the storage capacity be extended. There is however a problem caused by the fact that the grain tank contains obstructions that would prevent an inverted box with rigid sides from being dropped into it from above. For example, in smaller harvesters the grain enters the tank from a discharge tube in one side of the tank and a shaft extends across the tank which carries a screw for distributing the grain evenly in the tank. Both the discharge tube and the screw shaft would obstruct the path of a rigid side panel. There are however at least two sides of the grain tank that do not present an obstruction to the telescopic collapsing of the side panels into the grain tank and these in the first aspect of the present invention are rigidly and permanently connected to the cover.

A side panel that does overlie an obstruction can also be connected to the cover if it is formed with a cut-out which will straddle the obstruction in the lowered position of the cover. A cut-out to fit over a small obstruction, such as the screw shaft mentioned above, can be covered by a flap of flexible material when the cover is in its elevated position.

For a larger cut-out, such as would be required to fit around the discharge tube, it is preferable not to use a flexible flap because of the grain pressure on the flap. If the flap surface is too large, the grain pressure can push the flap through the cut-out, making it possible for the grain to fall out of the grain tank. It is preferred instead to provide a hinged rigid flap which acts to cover the cut-out when the cover is in its elevated position. The rigid flap may conveniently be mounted on the grain tank to be pivoted into a position to cover and close off the cut-out in the side panel by the lifting of the cover.

Instead of having a pivoted flap to cover a cut-out in a side panel, it is alternatively possible for the whole of a side panel to be mounted pivotally on the cover or on the grain tank to move between a horizontal position and a vertical position in synchronism with the lifting of the cover by the lifting mechanism.

In the preferred embodiment of the invention, the lifting mechanism is operative to maintain the cover parallel to the plane of the opening in the grain tank as it is raised to the elevated position. To this end, the cover may suitably be formed with depending legs which are each pivotally connected to a respective arm that is rotatably connected to the grain tank, the arms being connected to rotate in unison. In this case, the raising of the cover is accompanied by a transverse movement and it is therefore important to ensure that any rigid side panels that lie in the plane of movement of the arms are shorter that the corresponding side of the opening.

While fewer legs may suffice, it is preferred for the cover to have four depending legs connected to two pairs of arms, each pair of arms projecting radially from a respective one of two torque tubes that are linked to rotate in unison relative to the grain tank.

As the aim of the invention is to provide an inexpensive grain tank extension, the raising and lowering of the cover is conveniently performed manually using an operating lever acting on the torque tubes.

The operating lever may act on one of the torque tubes through a toggle mechanism which is spring-biased to define two stable end positions, corresponding to the lowered and elevated positions of the cover and an unstable over-centre position. When the cover is in its lowered position, the first stable position of the toggle mechanism prevents the automatic opening of the grain tank when driving over an uneven road surface. When the cover is in its elevated position, the second stable position of the toggle mechanism prevents the cover from collapsing.

The toggle mechanism is further connected to a gas spring that is located outside the grain tank. This gas spring is used to decrease the force needed to open and close the cover. The use of a toggle mechanism also reduces the dynamic loads on the gas spring.

In accordance with a second aspect of the invention, there is provided a grain tank of an agricultural harvester having a top formed with an opening, a cover overlying the opening, a lifting mechanism for raising the cover to an elevated position and side panels that extend between the cover and the top of the grain tank when the cover is in the elevated position to provide an enclosed extension volume that increases the storage capacity of the grain tank, wherein the lifting mechanism comprises legs which depend from the cover each leg being pivotally connected to a respective arm that is rotatably mounted in the grain tank, the arms being connected to rotate in unison.

The second aspect of the invention provides an inexpensive for raising and lowering a cover which is simple to operate and which does not risk being jammed by the grain in the tank.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
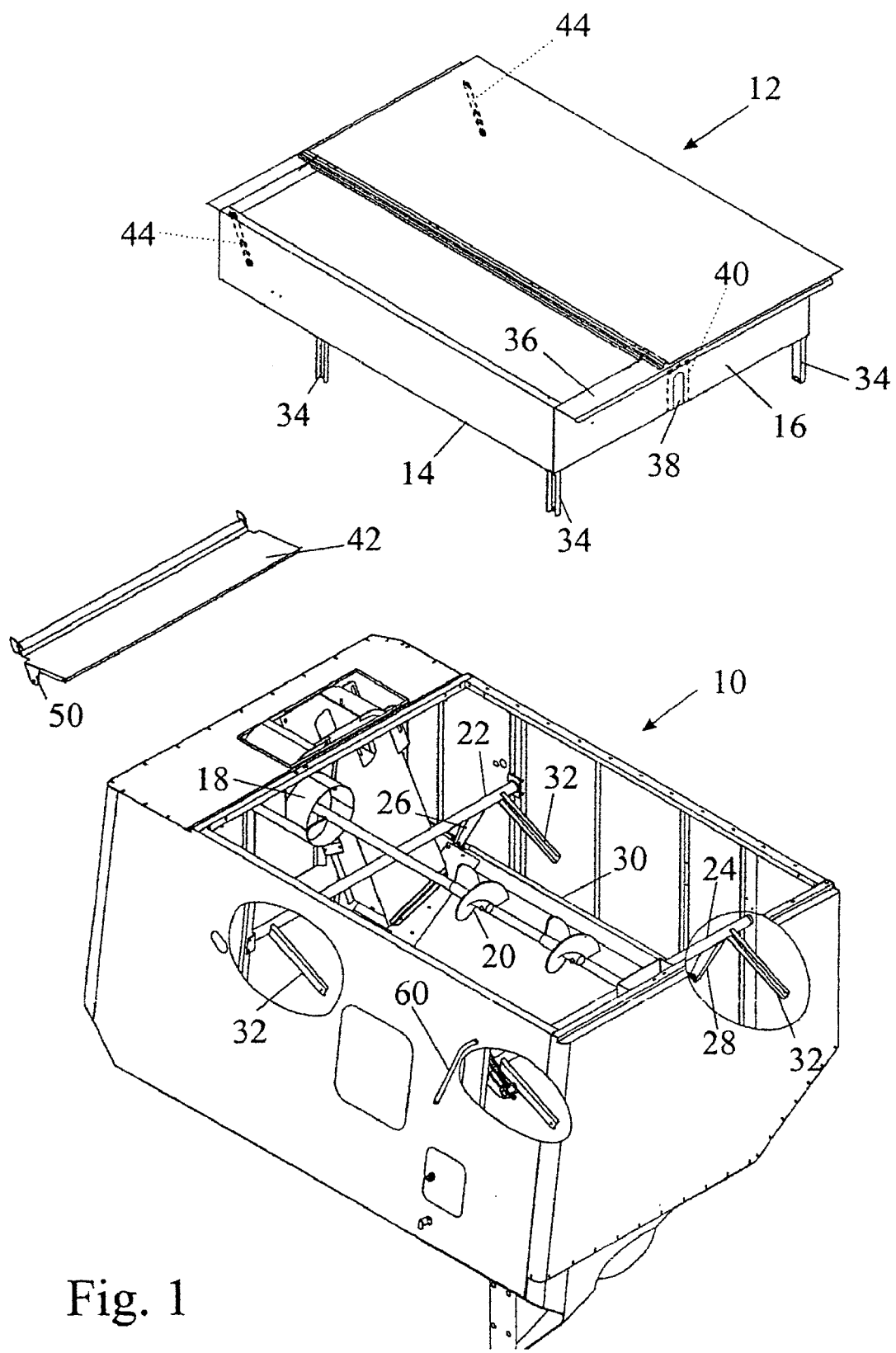
FIG. 1 is an exploded and partly cutaway view of a grain tank having a cover that can be raised and lowered.

Referring now to FIG. 1, a grain tank generally designated 10 is fitted with a cover 12 that can be raised and lowered. The cover 12 is in the form of an inverted box having sides 14 and 16 that are rigidly connected to it and that slide in and out of the grain tank 10 as the cover is moved between its lowered and raised positions to increase the volume of the grain tank. In all positions, the grain tank remains protected by the cover 12 so that rain cannot fall onto grain in the tank.

It is important for the mechanism used to raise and lower the cover to be capable of functioning even when the tank is almost filled with grain and that it should not be blocked nor damaged by the grain. This mechanism makes it possible to fill the grain tank in two positions, first when the cover 12 is lowered and second when the cover 12 is closed. To achieve these objectives, the lifting mechanism of the illustrated preferred embodiment of the invention comprises two torque tubes 22 and 24 that extend parallel to one another in the tank and are linked for rotation in unison with one another. The linkage that couples the torque tube 22, 24 with one another comprises a pair of radial arms 26, 28 on the respective torque tubes the ends of which arms are connected to one another by means of a tube 30. Each of the torque tubes 22, 24 also has near its ends two further radial arms 32 that are pivotably connected to the ends of four legs 34 that depend from the cover 12. In this way, as the torque tubes 22, 24 are rotated, the radial arms 32 move in unison between a 5 O'clock and a 1 O'clock position thereby not only raising the cover 12 but also subjecting it to a certain degree of side to side movement. To permit such movement, it is necessary for the sides 14 of the cover not to be as wide as the opening in the grain tank into which they fit. To ensure that the grain tank is fully protected against rain, the cover 12 has an over-hanging portion 36 that extends beyond the right side 16, as viewed in FIG. 1.

The grain tank 10 is typical of those to be found on smaller harvesters and has a discharge opening 18 at one side. Such positioning of the discharge opening 18 is not ideal for obtaining an even distribution of grain within the tank and in order to spread the grain more evenly there is mounted in the top of the tank a rotatable screw 20.

To obtain maximum advantage of the available volume within the tank 10, minimum power consumption and minimum grain damage when filling the tank, it is important for the discharge opening 18 and the screw 20 to be arranged as near to the top of the tank as possible. Because of this, they tend to interfere with the sides of the cover 12 as it is being telescopically collapsed into the tank 10.

In order to accommodate the shaft of the screw 20, the right side 16 of the cover 12 (as viewed in the drawings and from the front of the vehicle) is formed with a cut-out 38. In the raised position of the cover 12, a flap 40 of flexible material arranged inside the cover and represented in dotted lines in FIG. 1 overlies the cut-out and closes it off.

Figure 2:
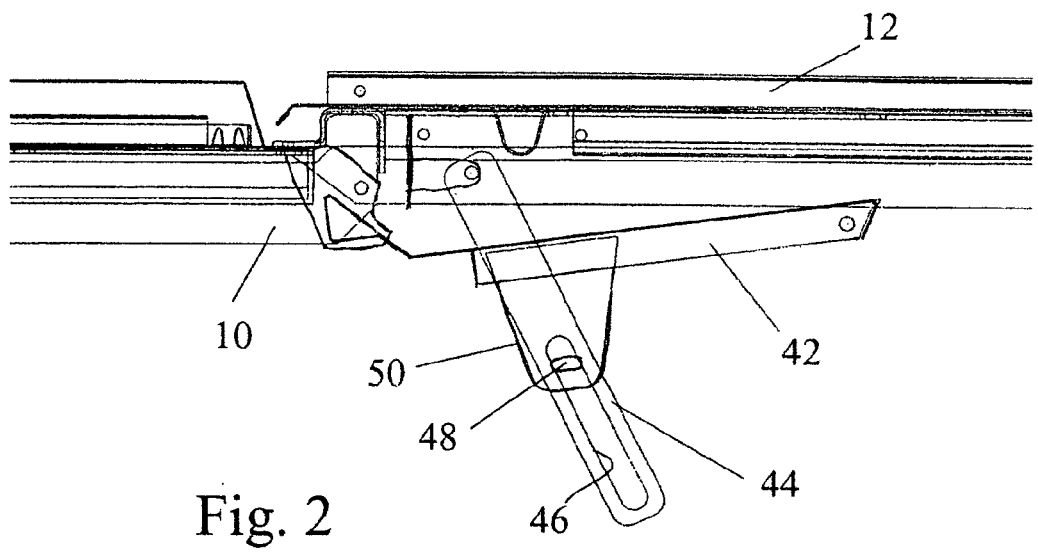
FIG. 2 is a section through the top of the grain tank of FIG. 1 with the cover in it lowered position.
Figure 3:
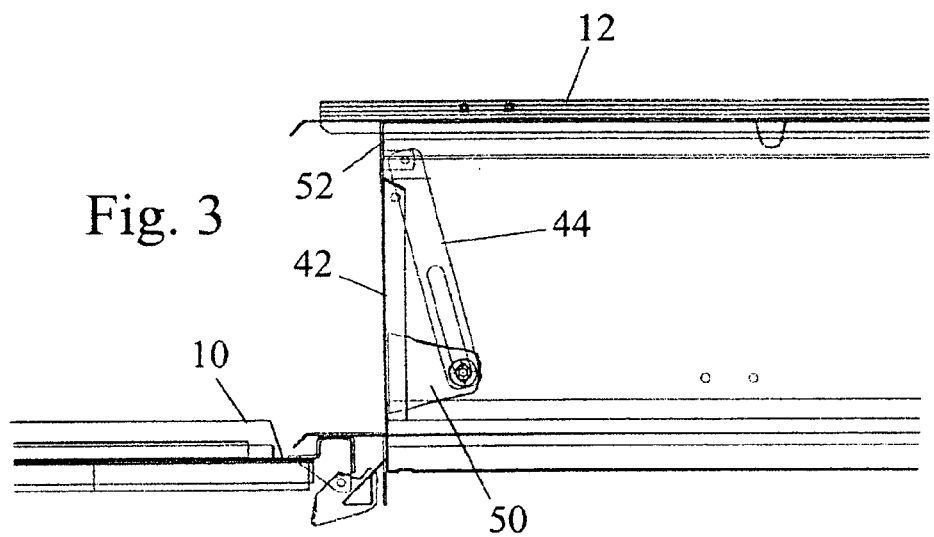
FIG. 3 is a similar view to FIG. 2 showing the cover in it raised position.

It is not desirable to use a flexible flap to cover a cut-out large enough to fit over the discharge opening 18, because it may not be able to withstand the grain pressure. Instead, the illustrated preferred embodiment employs a pivotable panel 42 to close the entire front side of the cover 12 in its raised position. The panel 42 may be hinged on the cover itself, but it is preferred for it to be hinged as shown in FIGS. 2 and 3 to the top of the grain tank. The tank cover 12 is fitted with pivotable arms 44 each having a slot 46 that receives a pin 48 projecting from a bracket 50 formed by bending over an end of the panel 42. Thus, as will be apparent by comparing FIGS. 2 and 3, as the cover 12 is raised, the pin 48 first slides in the slot 46 and then pulls on the bracket 50 to hinge the panel 42 counter-clockwise as viewed into a raised position in which it seals against a border 52 that forms part of the cover 12. The cover 12 in the illustrated embodiment therefore has three closed sides and one open side, the open side being closed by a panel 42 that is separately raised as the cover 12 reaches its raised position. This same approach can be used at the left side of the tank if desired or to allow the sides of the cover to accommodate any form of obstruction to the movement of the cover.

The raising and lowering of the cover 12 is performed manually in the illustrated embodiment of the invention using a handle 60. The handle 60 is connected to a short shaft that is journalled in a bearing 62 on the front of the grain tank. Within the tank 10, the shaft is fast in rotation with a short lever 64 that forms part of a toggle mechanism. The other half of the toggle is constituted by a rod 66 which pivotably connected to the lever 64 and passes slidably at its other end through a pin 68 carried by a bell-crank lever 70. The opposite end of the end bell-crank lever 70 is coupled for rotation with the torque tube 24 and a spring 72 fits over the rod 66 to provide the desired toggle action.

Figure 4:
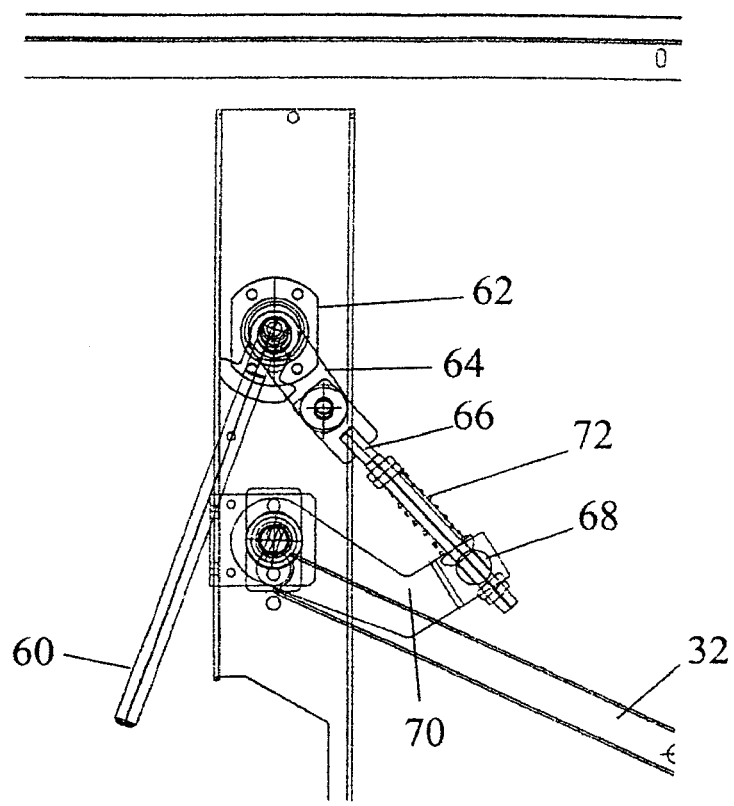
FIG. 4 is a diagrammatic representation of a handle and toggle mechanism used to raise and lower the cover, the handle being shown in the lowered position of the cover.
Figure 5:
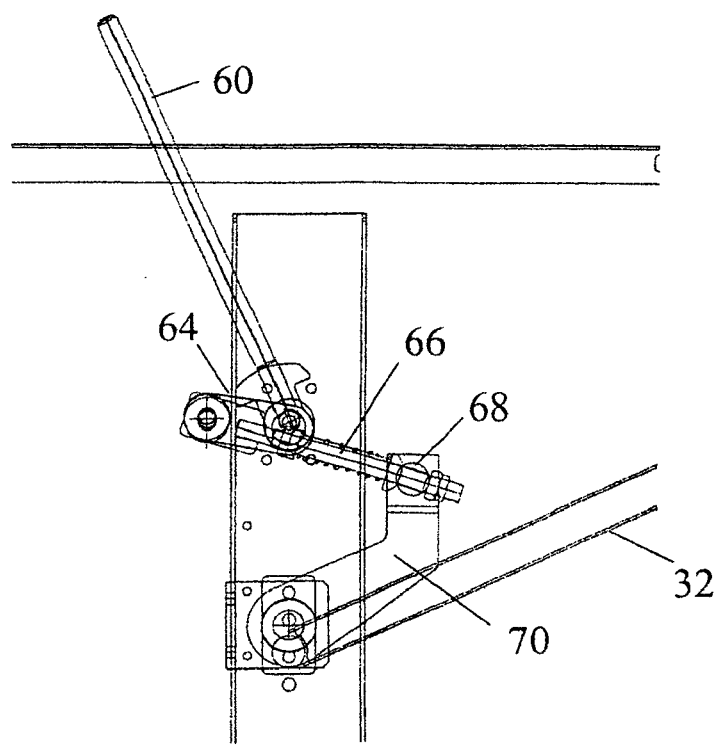
FIG. 5 is a similar view to FIG. 4 showing the handle in the raised position of the cover.

To raise the cover 12, the handle 60 is rotated clock-wise from the position shown in FIG. 4 to that shown in FIG. 5. This causes rotation of the lever 64 of the toggle mechanism which now pulls on the rod 66 and causes the bell-crank lever 70 and with it the torque tube 24 and the cover lifting arm 32 to rotate counter-clockwise. As it reaches the end of its movement, the lever 64 goes past the over-centre position and the toggle action locks it into position.

In order to reduce the forces required to operate the handle 60 it is possible to provide a counter-balance spring (not shown) that tends to rotate the torque tubes 22 and 24 counter-clockwise against the action of the weight of the cover. Such a counter-balance spring can have one end anchored within the tank and its opposite end secured so one of the radial arms 26, 28 or 32 or to the interconnecting tube 30. It is also possible to use a gas spring instead of a counter-balance spring. This gas spring can be located outside the grain tank to increase its lifetime.

Of course, instead of the lifting mechanism being manually operated, it would be alternatively possible to provide an electric actuator or motor for rotating the torque tubes 22, 24 and in such an embodiment of the invention it may be desirable to provide a counter-balance spring to reduce the load on the electric motor.

The cover 12 as shown in FIG. 1 has a door that can be opened to allow the interior of the grain tank to be inspected. Such a door is conventionally present for this purpose and for this reason its construction has not been shown and will not be described in detail.

The invention claimed is:

1. A grain tank of an agricultural harvester, comprising:
a top formed with an opening;
a cover overlying the opening;
a lifting mechanism for raising the cover to an elevated position;
a plurality of side panels that extend between the cover and the top of the grain tank when the cover is in the elevated position to provide an enclosed extension volume that increases the storage capacity of the grain tank, wherein at least two of the side panels are rigidly and permanently connected to the cover, wherein,
one of the at least two side panels overlies an obstruction within the grain tank, wherein the one of the at least two side panels is formed with a cut-out within which the obstruction is accommodated in the lowered position of the cover.

2. A grain tank as claimed in claim 1, wherein the cut-out is covered by a flap of flexible material when the cover is in the elevated position.

3. A grain tank as claimed in claim 2, having a side panel that is pivotally mounted on the cover or on the grain tank to move between a horizontal position and a vertical position in synchronism with the lifting of the cover by the lifting mechanism.

4. A grain tank as claimed in claim 1, wherein a hinged rigid flap serves to cover the cut-out when the cover is in the elevated position.

5. A grain tank as claimed in claim 4, wherein the rigid flap is mounted on the grain tank and is pivoted into a position to cover and close off the cut-out in the side panel by the lifting of the cover.

6. A grain tank as claimed in claim 5, having a side panel that is pivotally mounted on the cover or on the grain tank to move between a horizontal position and a vertical position in synchronism with the lifting of the cover by the lifting mechanism.

7. A grain tank as claimed in claim 6, wherein the lifting mechanism is operative to maintain the cover parallel to the plane of the opening in the grain tank as it is raised to the elevated position.

8. A grain tanks as claimed in claim 7, wherein the cover is formed with depending legs which are each pivotally connected to a respective arm that is rotatably mounted in the grain tank, the arms being connected to rotate in unison.

9. A grain tank as claimed in claim 8, wherein the cover has four depending legs connected to two pairs of arms, each pair of arms projecting radially from a respective one of two torsion tubes that are linked to rotate in unison relative to the grain tank.

10. A grain tank as claimed in claim 9, wherein an operating lever is provided for manually turning the torsion tubes.

11. A grain tank as claimed in claim 10, wherein the operating lever is connected to a toggle mechanism which passes through an unstable over-centre position as the cover is lifted from its lowered position to its elevated position.

12. A grain tank as claimed in claim 4, having a side panel that is pivotally mounted on the cover or on the grain tank to move between a horizontal position and a vertical position in synchronism with the lifting of the cover by the lifting mechanism.

13. A grain tank as claimed in claim 1, having a side panel that is pivotally mounted on the cover or on the grain tank to move between a horizontal position and a vertical position in synchronism with the lifting of the cover by the lifting mechanism.

14. A grain tank as claimed in claim 1, having a side panel that is pivotally mounted on the cover or on the grain tank to move between a horizontal position and a vertical position in synchronism with the lifting of the cover by the lifting mechanism.

15. A grain tank as claimed in claim 1, wherein the lifting mechanism is operative to maintain the cover parallel to the plane of the opening in the grain tank as it is raised to the elevated position.

16. A grain tank of an agricultural harvester having a top formed with an opening, a cover overlying the opening, a lifting mechanism for raising the cover to an elevated position and a plurality of side panels that extend between the cover and the top of the grain tank when the cover is in the elevated position to provide an enclosed extension volume that increases the storage capacity of the grain tank, wherein the lifting mechanism comprises legs which depend from the cover each leg being pivotally connected to a respective arm that is rotatably mounted in the grain tank, the arms being connected to rotate in unison, wherein at least one of the side panels overlies an obstruction within the grain tank, and wherein the at least one side panel is formed with a cut-out within which the obstruction is accommodated in the lowered position of the cover.

* * * * *